US006010233A

United States Patent [19]

Mulder et al.

[11] Patent Number: 6,010,233

[45] Date of Patent: Jan. 4, 2000

[54] AUTOMOBILE HEADLAMP REFLECTOR

[75] Inventors: R. Stephen Mulder, Windsor, Canada; Richard G. Tuck, Eastsound, Wash.

[73] Assignee: Hallmark Technologies, Inc., Windsor, Canada

[21] Appl. No.: 08/987,271

[22] Filed: Dec. 9, 1997

[51] Int. Cl.[7] .......... B60Q 1/04

[52] U.S. Cl. .......... 362/297; 362/346; 362/517; 362/518

[58] Field of Search .......... 362/297, 346, 362/517, 518, 343

[56] References Cited

U.S. PATENT DOCUMENTS

| | | | |
|---|---|---|---|
| 1,814,326 | 7/1931 | Melton | 362/518 |
| 5,003,435 | 3/1991 | Nakata | 362/61 |
| 5,096,281 | 3/1992 | Windebank et al. . | |

*Primary Examiner*—Nimeshkumar D. Patel
*Assistant Examiner*—Joseph Williams
*Attorney, Agent, or Firm*—Harness, Dickey & Pierce, P.L.C.

[57] ABSTRACT

An interchangeable headlamp reflector and light bulb unit is provided which can be used as part of various automotive headlamp assemblies. The surface of the reflector is defined mathematically by considering the optical path differences between a ray of light from a light source and a ray of light from a vertical cylindrical axis. The reflector is made of a low number of individual segments that each define a certain portion of the resulting beam of light. Each segment has light rays that extend parallel to the ground and diverge horizontally, thus minimizing possible hot spots on the lens of the reflector assembly.

14 Claims, 2 Drawing Sheets

AUTOMOBILE HEADLAMP REFLECTOR

FIELD OF THE INVENTION

The present invention relates generally to headlamp reflector assemblies and, more particularly, to the design and manufacture of a reflector and light source unit that can be used in various headlamp assemblies with the reflector having a complex interior surface made of a minimal number of segments, each segment producing a beam of light of predetermined shape and intensity.

BACKGROUND AND SUMMARY OF THE INVENTION

Headlamp assemblies are used in all types of vehicles including, automobiles, airplanes, motorcycles, off-road equipment, and the like. Traditionally, in the automotive business, a new headlamp assembly would be designed and manufactured for each car that was to be manufactured. This required automotive design engineers to first consider the envelope the entire headlamp assembly was to encompass. Once the envelope was established, an entire headlamp assembly could be designed to specifically fit that particular envelope. Each assembly would contain a variety of components including an outer cover lens, a reflector, a light source and a body or frame to support the light source and reflector. Because designing a new headlamp assembly for each car model is costly, it would be preferred to standardize as many of these components as possible and to use the standardized parts in as many different makes of automobiles as possible. Thus, there is a need for a reflector and light source unit that can be utilized with various headlamp support frames in numerous automobiles. The headlamp reflector of the headlamp assembly must be carefully designed so that the resulting illumination beam has the required intensity distribution pattern.

Conventional headlamp beam patterns require a sharp cutoff line that is parallel to the horizon and a beam width of plus or minus thirty degrees. This defines the maximum vertical extent of the beam as well as the minimum horizontal spread of the beam. This combination of horizon line cutoff and controlled horizontal spread is typical of all foreign and domestic (low-beam) headlamp beam patterns.

When designing a headlamp assembly, it is preferred to have a headlamp beam pattern that is as smooth as possible. It is also preferred to have a headlamp reflector that generates a beam pattern that does not create any localized hot spots on the clear cover lens. It is further preferred to have a headlamp assembly comprised of a reflector constructed of a minimal number of segments or facets, each contributing some portion of the beam pattern. The resulting reflector, by virtue of smaller size and reduced feature count, will be less costly to manufacture and can be used in several different headlamp assemblies. The smaller size and reduced feature count are made possible by a unique geometric definition of the reflector surface.

According to one aspect of the invention, an automotive headlamp reflector unit is comprised of a one-piece light reflector with a light source mounted generally in the middle of the reflector. The reflector is formed of separate curved segments that are arranged to form a composite reflective surface. Each segment is shaped to provide an optimum reflected light pattern. All of the reflected light patterns together form a composite light pattern to satisfy legal, safety and aesthetic requirements.

The relatively smaller size of the reflector unit allows its installation within the confines of a variety of different sizes and shapes of headlamp support frames. A decorative bezel would typically fill the space between the functional reflector and the support frame. While the reflector could be common across several vehicle types, the optically non-functional bezel would be a custom interface between the functional reflector and its support frame.

The cost of designing and building a custom bezel is substantially less than the cost of designing and building a custom headlamp, because there are no optical requirements other than to not block the light from the headlamp.

According to another aspect of the invention, a smooth beam pattern is obtained by allowing the reflected images of the light source to he smeared or unfocused in the horizontal direction while a sharp horizontal line cutoff is obtained because the light rays are kept parallel to the ground. Each reflector facet transforms a nominally spherical wavefront from a point light source, i.e., bulb, into a cylindrical wavefront with a vertical axis. A portion of a (vertical) cylindrical wavefront is ideal for headlamp design because it is characterized by zero vertical light spreading and arbitrary horizontal light spreading.

The surface of the reflector is designed by taking into consideration the coordinates of an ideal point light source and the coordinates of the axis of a cylindrical wavefront. The axis of the cylindrical wavefront is oriented vertically so that the vertical spread of the reflected beam is zero. This minimizes the ability of the reflected beam of light to diverge or converge vertically. The horizontal spread, however, is controlled by the width and the location of the reflector relative to the axis of the cylindrical wavefront. When the axis of the cylindrical wavefront is behind the reflector, the lamp output is strictly diverging, and no focal hot spots will form on the clear cover lens. This is particularly important for smaller lamps, to avoid thermal damage to the cover lens.

The physical configuration of the reflector is itself defined mathematically by considering the optical path difference between a ray of light from the light source and a ray of light from the cylindrical axis.

According to yet another aspect of the invention, a headlamp reflector assembly is comprised of a light source that is located approximately in the middle of and surrounded by a generally concave dish-like reflective surface. The light source is operable to emit light waves that diverge onto the reflector yet reflect off substantially parallel to the ground.

The reflector is offset from the light source and has preferably eight to twelve reflective segments. The segments together define the entire reflective surface which reflects a beam of light composed of a collection of nominally cylindrical wavefronts through a lens. Because of the design of the resulting beam of light, hot spots on the surface of the lens are minimized.

For the following specification taken in conjunction with the accompanying drawings and appended claims, other objects, features, and advantages of the present invention will become apparent to those skilled in the art.

DETAILED DESCRIPTION OF THE PREFERRED EMBODIMENT

Figure 1:
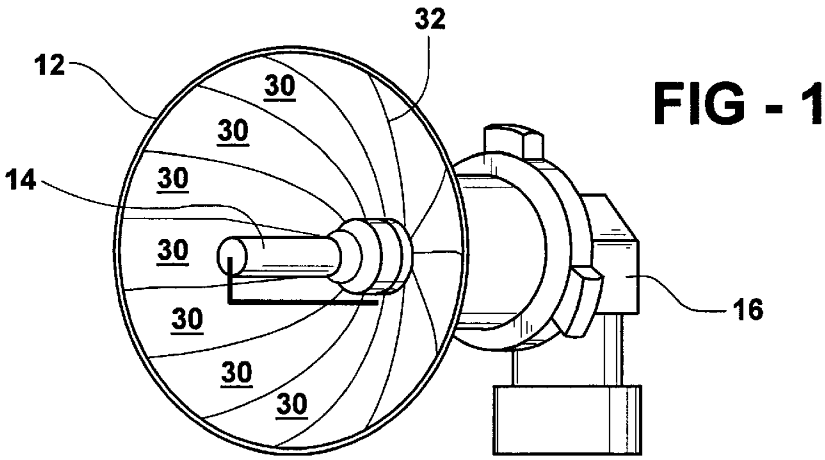
FIG. 1 is a perspective view of the present invention illustrating the novel headlamp reflector and the individual segments that define the surface of the reflector.
Figure 2:
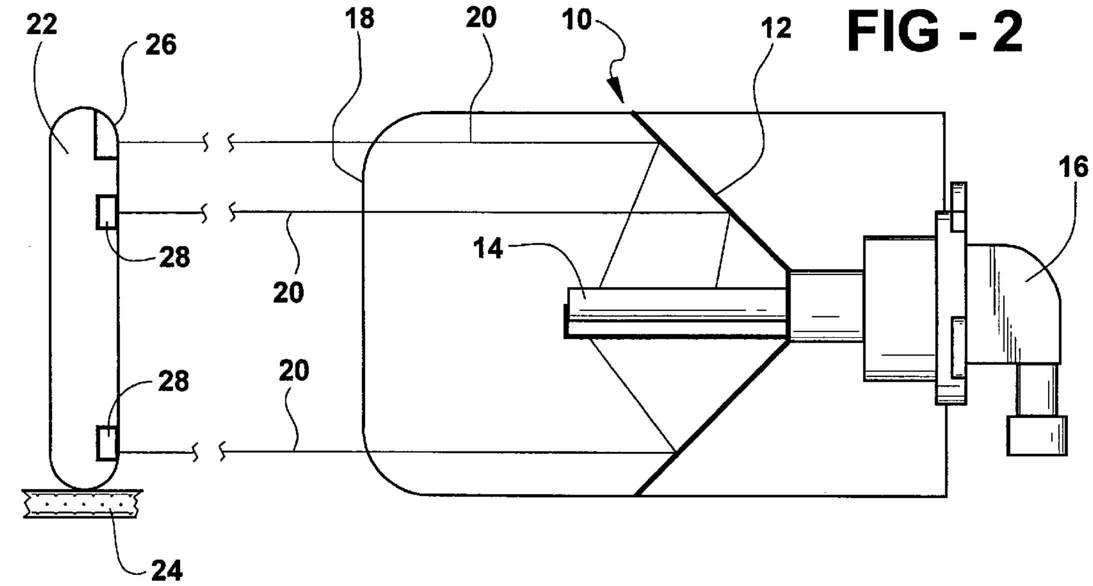
FIG. 2 is a side elevational view of a headlamp assembly and some of the light rays that create the beam pattern.

With reference to FIGS. 1 and 2, a novel headlamp assembly 10 is illustrated which includes a unique reflector 12, a light source or bulb 14, bulb terminals 16, and a cover lens 18. Together, the reflector 12, bulb 14, and terminals 16 create an interchangeable unit that can be used in conjunction with other automobile headlamp assemblies. The present assembly 10 is operable to generate cylindrical wavefronts of rays 20 which pass through the lens 18. The cylindrical wavefronts of rays 20 exit from the lens 18 and create a beam pattern 22 that illuminates the road for the driver of the vehicle.

The beam pattern 22 is smooth and is comprised of a plurality of individual rays 20 that are nominally parallel to the ground 24. Each ray 20 maps; onto some point 26 in the beam pattern. Points in the beam pattern are characterized by their horizontal and vertical angles with respect to the axis of the vehicle.

The beam pattern is comprised of a plurality of smaller portions 28 which, when combined, create a desired beam pattern of predetermined shape and intensity. The portions of the beam pattern contributed by each facet are generally overlapping rather than contiguous, in order that the beam pattern appear smooth rather than spotty.

Figure 3:
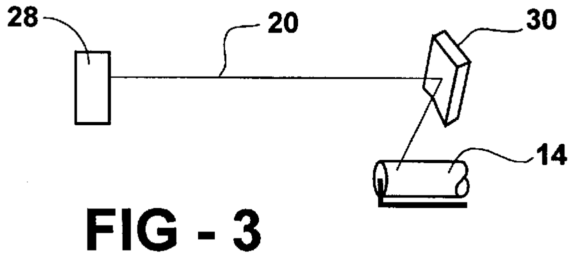
FIG. 3 is a perspective view of one segment of the reflector illustrating a beam of light emanating from the light source onto the reflector and then reflecting into its portion of the beam pattern.
Figure 4:
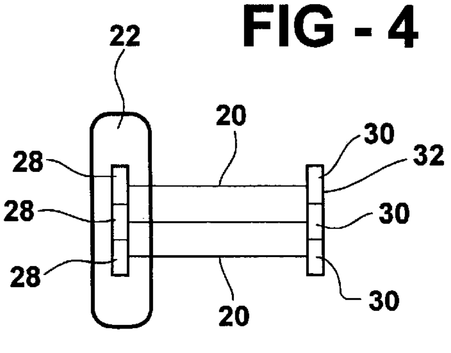
FIG. 4 is a top view of a number of segments illustrating beams of light leaving the segments and illuminating various portions of the beam pattern.

With reference to FIGS. 3 and 4, the reflector 12 is of unique configuration and is comprised of between eight to twelve individual segments 30. Each segment 30 is specially configured to reflect light rays 20 that are nominally parallel to the ground, but with a controlled horizontal range of angles to create a smooth beam of light.

Each segment 28 is responsible for illuminating a portion 22 of the beam pattern 22. It is the compilation of each of these portions 28 that creates a beam pattern 22 that ultimately illuminates the road for the driver.

Figure 5:
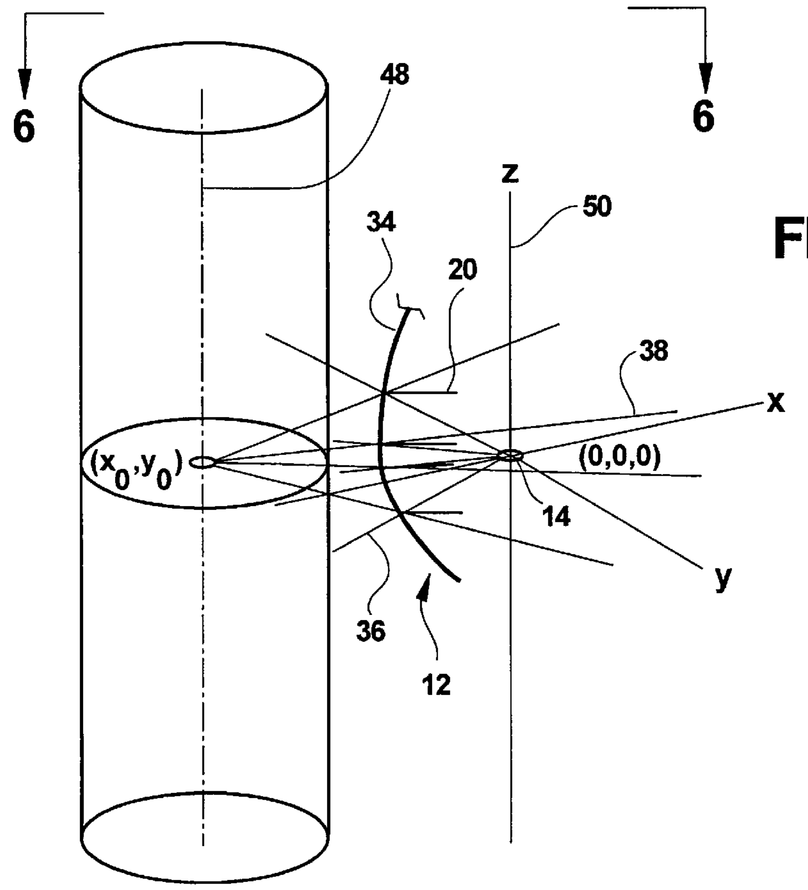
FIG. 5 is a ray diagram useful in explaining the generation or; the surface of the reflector.
Figure 6:
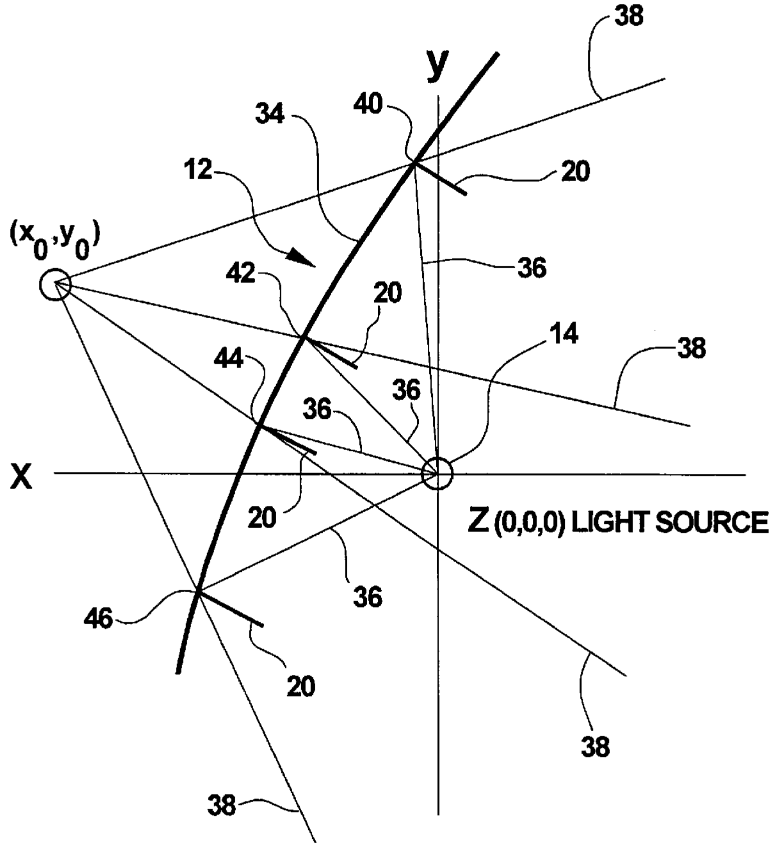
FIG. 6 is another ray diagram taken from the perspective of line 6—6 of FIG. 5, illustrating the rays as they are reflected by the surface of the reflector.

With reference to FIGS. 5 and 6, each reflector facet 12 uniquely configured and may be used as part of a standard reflector that can be utilized with several different headlamp assemblies and consequently used on various automobiles. The geometry of the reflector facet 12 is defined by considering two light rays that meet at a point 34 on the reflector facet surface. One ray is selected from the virtual cylindrical wavefront emanating from behind the facet, while the other is selected from the idealized spherical wavefront from the real light source.

Specifically, the surface of the reflector is defined mathematically by establishing the optical path difference between a ray 36 from the point source or light bulb 14 and a ray 38 from the cylindrical axis, at any point on the reflector 12. The surface is defined by the fact that the optical path difference is a single constant for all corresponding pairs of input and output rays. The intersection of corresponding rays 36 and 38 at points 40, 42, 44, and 46 illustrate how the reflector surface is defined in terms of its input and output wavefronts of rays.

A cylindrical axis 48 is spaced apart and parallel to the vertically extending Z axis 50. For reference purposes, the light source point is located in space at the (0, 0, 0) coordinate and the cylindrical axis 48 passes through the point (XO, YO). The formula for this family of surfaces is represented by:

$$SQRT(X^2+Y^2+Z^2)SQRT((X-XO)^2+(Y-YO)^2)=K$$

where K is the constant path difference between the corresponding input and output rays. This equation can be expanded into a fourth order polynomial to facilitate use of the surface definition in computer aided design and optical design applications.

The fourth order polynomial equation is as follows:

$$A*Z^4+B*Z^2+C*X*Z^2+D*Y*Z^2+E*X+F*Y+G*X^2+H*Y^2+I*X*Y+J=O$$

where

A=1

B=−2*(K^2+XO^2+YO^2)

C=4*XO

D=4*YO

E=−4*XO*(K^2+XO^2+YO^2)+8*K^2*XO

F=−4*YO*(K^2+XO^2+YO^2)+8*K^2*XO

G=4*XO^2−4*K^2

H=4*YO^2−4*K^2

I=8*XO*YO

J=(K^2+XO^2+YO^2)^2−4*K^2* (XO^2+YO^2)

K=SQRT(Xp^2+Yp^2+Zp^2)−SQRT ((Xp−XO)^2+(Yp−YO)^2)

(with (Xp,Yp,Zp) being any single point on the reflector facet surface)

From these formulas, the surface 34 of the reflector facet is completely defined in terms of the cylindrical wavefront axis 48 and any single point, for example point 40, on the surface of the reflector facet. This relatively lean mathematical representation greatly facilitates rapid design iteration. The resulting reflector 12 can be manufactured by conventional methods and the reflector 12 can be used in a variety of automotive headlamp assemblies along with the light source 14 and terminal 16.

The design considerations and specific solution outlined above were specifically directed at the task of headlamp reflector design. It will be appreciated that the basic method employed, however, is much more general. For example, the cylindrical axis 48 need not be located behind the reflector 12. With tile cylindrical axis in front of the reflector, the defining surface equation becomes $$SQRT(X^2+Y^2+Z^2)+SQRT((X-XO)^2+(Y-YO)^2)=K$$

In this case the constant K is the total optical path from source to cylinder axis, via the reflector, and the light converges onto the axis instead of diverging away from the axis. The resulting surface is closed rather than open.

This type of surface could have application in laser pumping, taking the light from a short arc (point) source and directing it with high efficiency onto a laser rod along the cylinder axis. The basic source and image wavefront surfaces do not have to be a sphere and a cylinder; any definable wavefront will do. Example source and image shapes include, but are not limited to, spheres, planes, cylinders, cones and toroids.

The method is not limited to reflectors; it may also be applied to refractive or lens type designs. In the refractive case, the path lengths are multiplied by the refractive index of the transmitting material to yield the true optical path length. One application of this method is the rapid design of on-axis and off-axis fresnel lenses, including catadioptric lenses. Useful designs can be developed quickly on a CAD systems by intersecting a fresnel lens base surface with the family of surfaces implied by the required wavefront transformation. This method applies generally to problems involving controlled reflection and refraction, not only in visible optics, but in other areas such as radar and acoustics.

The foregoing discussion discloses and describes merely exemplary embodiments of the present invention. One skilled in the art will readily recognize from such discussion and from the accompanying drawings and claims that various changes, modifications, and variations can be made therein without departing from the spirit and scope of the invention as defined in the following claims:

What is claimed is:

1. An automotive headlamp reflector unit comprising:

a one-piece light reflector with a light source mounted generally in the middle of the reflector, the reflector being formed of separate curved segments arranged to form a composite reflective surface, each segment being curved to provide an optimum light beam pattern in a predetermined direction and of a predetermined shape, with all of the light beam patterns together forming a composite beam;

and the reflector and light source are formed for mounting within headlamp support frames of different shapes and sizes for various automobiles, and wherein the separate curved segments are defined by the following form of fourth order polynomial:

$$A*Z^4+B*Z^2+C*X*Z^2+D*Y*Z^2+E*X+F*Y+G*X^2+H*Y^2+I*X*Y+J=O$$

where

A=1

B=−2*(K^2+XO^2+YO^2)

C=4*XO

D=4*YO

E=−4*XO*(K^2+XO^2+YO^2)+8*K^2*XO

F=−4*YO*(K^2+XO^2+YO^2)+8*K^2*YO

G=4*XO^2−4*K^2

H=4*YO^2−4*K^2

I=8*XO*YO

J =(K^2+XO^2+YO^2)^2−4*K^2* (XO^2+YO^2)

K=SQRT(X^2+Yp^2+Zp^2)−SQRT((Xp−XO) ^2+(Yp−YO) ^2).

wherein point (Xp,Yp and Zp) is an arbitrary point on the separate curved segments.

2. The automotive headlamp reflector unit as claimed in claim 1, wherein the reflector has approximately 10 reflective curved segments encompassing the entire reflective surface to reflect light rays in an optimum beam pattern.

3. The automotive headlamp reflector unit as claimed in claim 1, further comprising a lens positioned in front of the reflector, the lens having a surface, the reflector directing light rays onto the surface in a manner to minimize hot spots on the surface of the lens.

4. The automotive headlamp reflector unit as claimed in claim 2, wherein the cylindrical profile is comprised of a plurality of light rays, each ray extending substantially parallel to the ground.

5. The automotive headlamp reflector unit as claimed in claim 2, wherein the light rays are parallel to the ground but diverging horizontally in a controlled manner.

6. The automotive headlamp reflector unit as claimed in claim 1, wherein the individual facet reflective surfaces are defined by equations of the form:

$$SQRT(X^2+Y^2+Z^2)-SQRT((X-XO)^2+(Y-YO)^2)=K.$$

7. The automotive headlamp reflector unit as claimed in claim 1, wherein the composite reflective surface is designed by the process of mathematically ascertaining the optical path difference between a ray of light from the light source and a ray of light from a vertical cylindrical axis.

8. The automotive headlamp reflector unit as claimed in claim 1, wherein each segment contributes to the creation of an illuminated beam pattern, the illuminated beam pattern extending through a lens and creating the composite beam.

9. The automotive headlamp reflector unit as claimed in claim 1, wherein each curved segment illuminates some portion of the beam pattern.

10. The automotive headlamp reflector unit as claimed in claim 1, wherein the reflector has between approximately eight to twelve curved segments.

11. A headlamp reflector unit comprising:

a one-piece light reflector formed of separate curved segments, each curved segment being adjoined to create a composite reflective surface, each composite reflective surface is defined by the equation $$SQRT(X^2+Y^2+Z^2)-SQRT((X-XO)^2+(Y-YO)^2)=K.$$

each segment being curved to generate a light pattern having a predetermined shape and direction, the reflector having a centrally located opening; and a light source extending through the opening and mounted generally in the middle of the reflector, the reflector and light source being formed for mounting within headlamp support frames of different shapes and sizes.

12. The headlamp reflector unit as claimed in claim 11, wherein the reflector has approximately eight to twelve curved segments which define the entire composite reflective surface, each segment designed to reflect light rays into a cylindrical wavefront.

13. The headlamp reflector unit as claimed in claim 11, wherein the light pattern is comprised of individual rays that are substantially parallel to the ground, and diverging horizontally.

14. A headlamp assembly comprising:

a light reflector formed of a plurality of segments, each segment being adjoined to create a reflective surface, each segment being curved to generate a light pattern having a predetermined shape in a predetermined direction, the reflector having a centrally located opening;

a light source extending through the opening and mounted generally in the middle of the reflector;

a set of terminals connected to the light source, the terminals being operable to deliver electricity to the light source;

a lens cover spaced apart from the light source and operable to seal the reflector and light source from the environment; and a headlamp body for housing the reflector, light source and the receptacle, whereas the reflector and light source are operable to be mounted within a variety of headlamp bodies of different shapes and sizes.

* * * * *